United States Patent
Fujimoto et al.

(10) Patent No.: US 9,685,246 B2
(45) Date of Patent: Jun. 20, 2017

(54) CONTROL SYSTEM FOR NUCLEAR FACILITY AND CONTROL METHOD FOR NUCLEAR FACILITY

(75) Inventors: Hiroshi Fujimoto, Tokyo (JP); Hironobu Shinohara, Tokyo (JP); Yasutake Akizuki, Tokyo (JP); Toshiki Fukui, Tokyo (JP); Yuichi Tanaka, Tokyo (JP); Shinji Kiuchi, Tokyo (JP); Hiroshi Shirasawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 636 days.

(21) Appl. No.: 13/877,233

(22) PCT Filed: Sep. 13, 2011

(86) PCT No.: PCT/JP2011/070904
§ 371 (c)(1),
(2), (4) Date: Apr. 1, 2013

(87) PCT Pub. No.: WO2012/049936
PCT Pub. Date: Apr. 19, 2012

(65) Prior Publication Data
US 2013/0202074 A1    Aug. 8, 2013

(30) Foreign Application Priority Data

Oct. 12, 2010  (JP) ................................. 2010-230078

(51) Int. Cl.
*G21D 3/04*   (2006.01)
*G21D 3/00*   (2006.01)

(52) U.S. Cl.
CPC .............. *G21D 3/04* (2013.01); *G21D 3/001* (2013.01); *Y02E 30/40* (2013.01)

(58) Field of Classification Search
CPC .......... G21D 3/00; G21D 3/001; G21D 3/008; G21C 17/00
(Continued)

(56) References Cited

U.S. PATENT DOCUMENTS

2004/0136487 A1*   7/2004   Shin .................. G21D 3/04
376/259

FOREIGN PATENT DOCUMENTS

JP   54-47983 A    4/1979
JP   55-101398 A   7/1980
(Continued)

OTHER PUBLICATIONS

Decision of a Patent Grant, dated Jul. 29, 2014, issued in corresponding JP application No. 2010-230078 with partial English translation. (2 pages).
(Continued)

*Primary Examiner* — Jack W Keith
*Assistant Examiner* — Lily C Garner
(74) *Attorney, Agent, or Firm* — Westerman, Hattori, Daniels & Adrian, LLP

(57) ABSTRACT

A control system allows controlling a nuclear facility in an evacuation area. The control system includes a control device in ordinary use disposed in a non-evacuation area, an emergency control device—for emergency in the evacuation area, a plant control facility connectable to the control device—and the emergency control device, a signal switching unit that switches from a normal coupling to an emergency coupling based on an emergency switch signal, a first selector switch in the non-evacuation area, a second selector switch-in the evacuation area, an AND circuit configured to output the emergency switch signal to the signal switching unit in the case where the emergency switch signal is input
(Continued)

from the first selector switch and the emergency switch signal is input from the second selector switch.

4 Claims, 3 Drawing Sheets

(58) Field of Classification Search
USPC .......................................................... 376/215
See application file for complete search history.

(56) References Cited

FOREIGN PATENT DOCUMENTS

| | | | |
|---|---|---|---|
| JP | 57-211596 | A | 12/1982 |
| JP | 58-158595 | A | 9/1983 |
| JP | 59-174787 | A | 10/1984 |
| JP | 59-190696 | A | 10/1984 |
| JP | 59-231488 | A | 12/1984 |
| JP | 60-151599 | A | 8/1985 |
| JP | 3-12595 | A | 1/1991 |
| JP | 5-333195 | A | 12/1993 |
| TW | 201028306 | A | 8/2010 |

OTHER PUBLICATIONS

English translation of Written Opinion of PCT/JP2011/070904, mailing date of Oct. 25, 2011.
International Search Report of PCT/JP2011/070904, date of mailing Oct. 25, 2011 (2 pages).
Extended (supplementary) European Search Report dated Apr. 7, 2017, issued in counterpart European Patent Application No. 11832374.0. (6 pages).

* cited by examiner

PRIOR ART

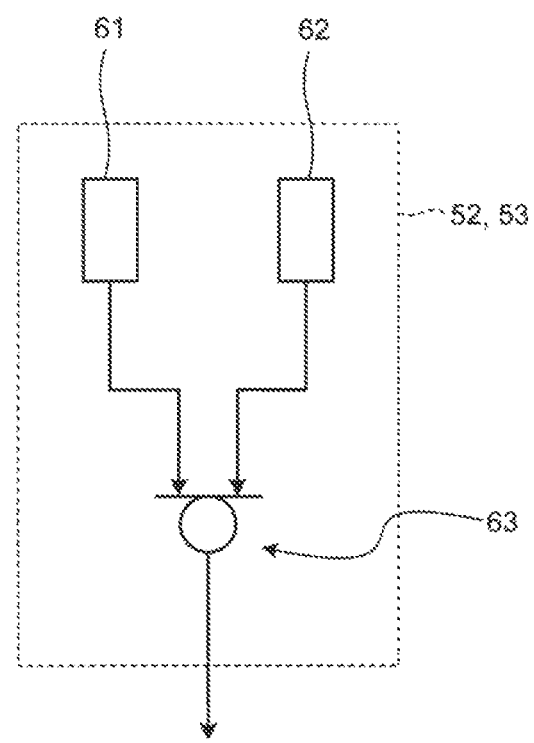

CONTROL SYSTEM FOR NUCLEAR FACILITY AND CONTROL METHOD FOR NUCLEAR FACILITY

FIELD

The present invention relates to a control system for a nuclear facility that allows controlling an operation of the nuclear facility within an evacuation area for evacuation when an emergency occurs.

BACKGROUND

Conventionally, a known remote shutdown system includes a central control, room control panel, a remote shutdown panel, an on-site multiple transmission device panel, and a mode selection switch (for example, see Patent Literature 1). The central control room control panel is disposed within a central control room and remotely controls a nuclear reactor. The remote shutdown panel is disposed outside of the central control room and remotely shuts down the nuclear reactor. The on-site multiple transmission device panel controls a plurality of loads at the nuclear reactor. Here, the mode selection switch provides either one of two couplings of a coupling between the central control room control panel and the on-site multiple transmission device panel or a coupling between the remote shutdown panel and the on-site multiple transmission device panel.

CITATION LIST

Patent Literature

Patent Literature 1: Japanese Patent Application Laid-open No. 59-174787

SUMMARY

Technical Problem

The conventional remote shutdown system has a mode selection switch that is an analog circuit switch with a contact point. Therefore, to collectively perform switching operations, coaxial cables are necessary to be disposed as multiplex transmission lines between the central control room control panel and the on-site multiple transmission device panel and between the remote shutdown panel and the on-site multiple transmission device panel. Accordingly, in the case where switching operations are collectively performed, a control circuit or a control device for multiple transmission is necessary to be separately added around the mode selection switch. That is, although the conventional remote shutdown system can collectively perform switching operations with analog equipment, the analog equipment differs from the central control room control panel in operation. Accordingly, this imposes burden on an operator. An incorrect operation of the mode selection switch or short circuit of the mode selection switch due to failure, fire spread, or similar trouble, may cause an incorrect switching operation where a coupling is unintentionally switched.

Therefore, it is an object of the present invention to provide a control system for a nuclear facility that facilitates switching operation between the operation control devices and reduces incorrect switching operations.

Solution to Problem

According to an aspect of a control system for a nuclear facility of the present invention, the control system for a nuclear facility that allows controlling an operation of a nuclear facility in an evacuation area for evacuation when an emergency occurs, the control system includes: a first operation control device in ordinary use, the first operation control device being disposed in a non-evacuation area, the non-evacuation area being an area other than the evacuation area; a second operation control device for emergency, the second operation control device being disposed in the evacuation area; a control device connectable to the first operation control device or the second operation control device; a signal switching unit configured to switch from a normal coupling between the control device and the first operation control device to an emergency coupling between the control device and the second operation control device based on an emergency switch signal to be input; a first selector switch disposed in the non-evacuation area, the first selector switch being configured to output an emergency switch signal by a switching operation to the emergency coupling; a second selector switch disposed in the evacuation area, the second selector switch being configured to output an emergency switch signal by a switching operation to the emergency coupling; and an AND circuit with an input side and an output side, the input side being coupled to the first selector switch and the second selector switch, the output side being coupled to the signal switching unit, wherein the AND circuit is configured to output the emergency switch signal to the signal switching unit in a case where the emergency switch signal is input from the first selector switch and the emergency switch signal is input from the second selector switch.

With this configuration, operating the first selector switch and the second selector switch to switch from the normal coupling to the emergency coupling facilitates collective switching from an operation with the first operation control device to an operation with the second operation control device. Additionally, switching the first selector switch to the emergency coupling side and switching the second selector switch to the emergency coupling side allow inputting the emergency switch signals to an AND circuit from the first selector switch and the second selector switch. This allows the AND circuit to output the emergency switch signal to the signal switching unit. In view of this, the signal switching unit receives the emergency switch signal and is allowed to switch from the normal coupling to the emergency coupling. Therefore, even if one of the first selector switch and the second selector switch incorrectly outputs the emergency switch signal, the AND circuit does not output the emergency switch signal. This consequently ensures reduced occurrence of incorrect switching between the operation control devices.

According to the aspect, it is preferable that the control device includes a processing device coupled to the signal switching unit, and the processing device is configured to: process a signal input to/output from the first operation control device through the signal switching unit; and process a signal input to/output from the second operation control device through the signal switching unit.

This configuration allows the first operation control device and the second operation control device to share the processing device. This eliminates the need for an additional processing device, thus reducing cost escalation of the device.

According to the aspect, it is preferable that at least any one of the first selector switch and the second selector switch includes: a first operating unit configured to output the emergency switch signal by a switching operation to the emergency coupling; a second operating unit configured to output the emergency switch signal by a switching operation to the emergency coupling; and an OF circuit with an input side and an output side, the input side being coupled to the first operating unit and the second operating unit, the output side being coupled to the AND circuit, wherein the OR circuit is configured to output the emergency switch signal to the AND circuit in a case where the emergency switch signal is input from at least any one of the first operating unit and the second operating unit.

With this configuration, switching any one of the first operating unit and the second operating unit to the emergency coupling side allows inputting the emergency switch signal to the OR circuit. This allows the OR circuit to output the emergency switch signal to the AND circuit. In view of this, even if any one of the first operating unit and the second operating unit is not able to output the emergency switch signal due to disconnection or similar trouble, this allows outputting the emergency switch signal as long as the other operating unit can output the emergency switch signal.

BRIEF DESCRIPTION OF DRAWINGS

FIG. 3 is a block diagram illustrating a first selector switch and a second selector switch according to Modification 1.

DESCRIPTION OF EMBODIMENTS

Hereinafter, a description will be given of a control system for a nuclear facility according to the present invention by referring to the accompanying drawings.

Figure 1:
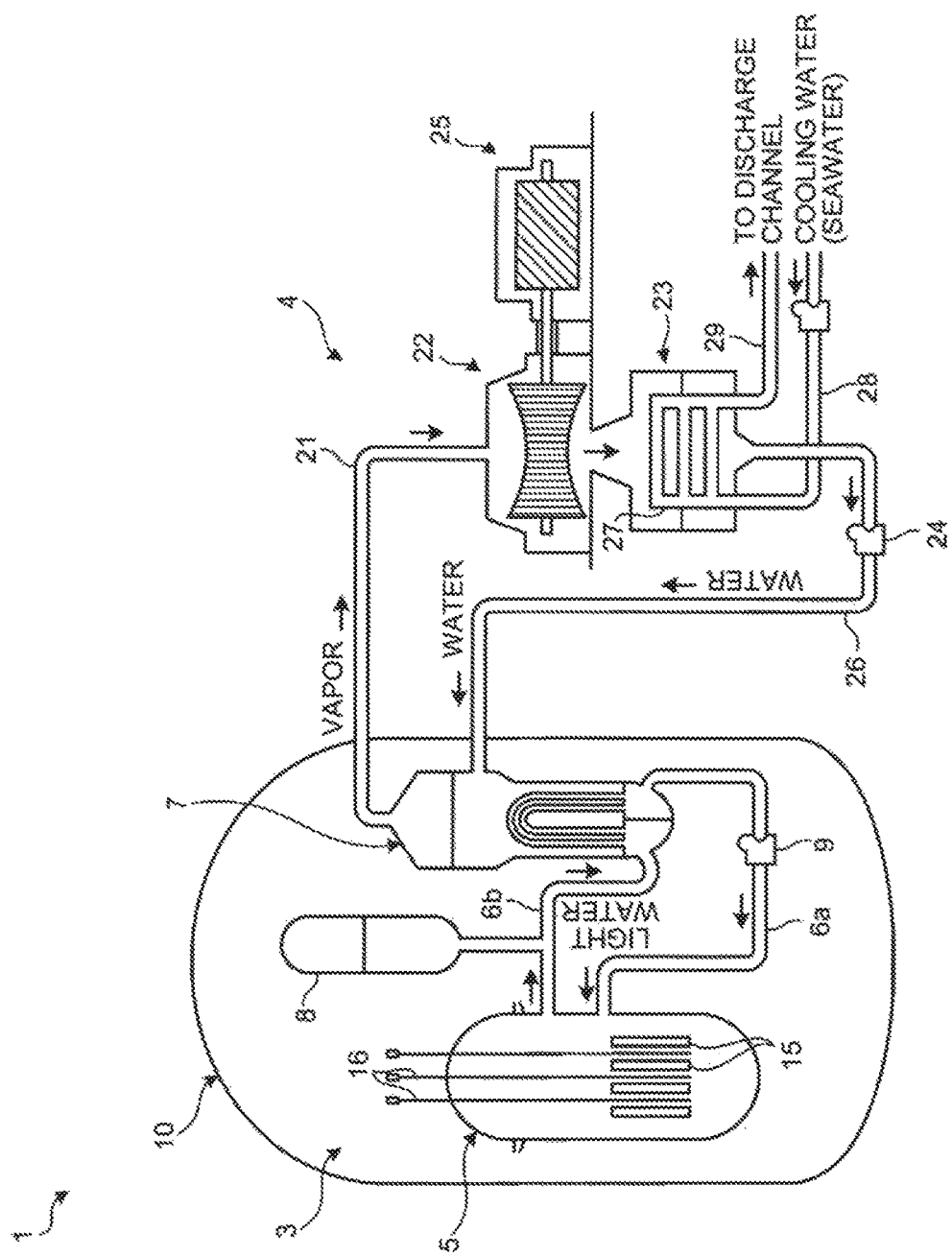
FIG. 1 is a schematic configuration diagram schematically illustrating a nuclear facility controlled by a control system according to an embodiment.

The following embodiment does not limit the present invention. Further, components in the following embodiment include components that can be easily conceived by a person skilled in the art or substantially the same components Embodiment FIG. 1 is a schematic configuration diagram schematically illustrating a nuclear facility controlled by a control system according to an embodiment. A control system 40 for a nuclear facility 1 according to the present invention controls the nuclear facility 1 with a nuclear reactor 5. The nuclear reactor 5 employs, for example, a Pressurized Water Reactor (PWR). The nuclear facility 1 with this pressurized water nuclear reactor 5 includes a reactor cooling system 3 that includes the nuclear reactor 5 and a turbine system 4 that exchanges heat with the reactor cooling system 3. A reactor coolant flows in the reactor cooling system 3 while a secondary coolant flows in the turbine system 4.

The reactor cooling system 3 includes the nuclear reactor 5 and a steam generator 7, which is coupled to the nuclear reactor 5 via a cold leg 6a and a hot leg 6b. Pressurizer 8 is interposed in the hot leg 6b while a reactor coolant pump 9 is interposed in the cold leg 6a. Then, the nuclear reactor 5, the cold leg 6a, the hot leg 6b, the steam generator 7, the pressurizer 8, and the reactor coolant pump 9 are housed in a containment 10.

The nuclear reactor 5, which is a pressurized water reactor as described above, is filled with the reactor coolant inside. In the nuclear reactor 5, a fuel assembly 15 is housed and multiple control rods 16, which control the nuclear fission of the fuel assembly 15, are removably inserted into the fuel assembly 15.

In the case where the fuel assembly 15 is made to fission while the nuclear fission reaction is controlled by the control rod 16, this nuclear fission provides heat energy. The provided heat energy heats the reactor coolant. The heated reactor coolant is fed to the steam generator 7 via the hot leg 6b. On the other hand, the reactor coolant is fed from the steam generator 7 via the cold leg 6a and flows through the nuclear reactor 5 to cool the inside of the nuclear reactor 5.

The pressurizer 8 interposed in the hot leg 6b applies pressure on the reactor coolant at high temperature to reduce boiling of the reactor coolant. Additionally, the steam generator 7 makes the reactor coolant at high temperature and high pressure to exchange heat with the secondary coolant. This consequently vaporizes the secondary coolant to generate vapor and cools the reactor coolant at high temperature and high pressure. The reactor coolant pump 9 circulates the reactor coolant in the reactor cooling system 3. The reactor coolant pump 9 feeds the reactor coolant into the nuclear reactor 5 from the steam generator 7 is the cold leg 6a, and feeds the reactor coolant into each steam generator 7 from the nuclear reactor 5 via the hot leg 6b.

Here, a description will be given of a sequence of operations in the reactor cooling system 3 of the nuclear facility 1. When the reactor coolant is heated with the heat energy generated by the nuclear fission reaction inside of the nuclear reactor 5, the reactor coolant pump 9 feeds the heated reactor coolant to the steam generator 7 via the hot leg 6b. The high-temperature reactor coolant passing through the hot leg 6b receives pressure from the pressurizer 8 to reduce boiling, and flows into the steam generator 7 at high temperature and high pressure. The reactor coolant after flowing into the steam generator 7 at high temperature and high pressure is cooled by exchanging heat with the secondary coolant. The cooled reactor coolant is fed to the nuclear reactor 5 via the cold leg 6a by the reactor coolant pump 9. Then, the cooled reactor coolant flows into the nuclear reactor 5 so as to cool the nuclear reactor 5. That is, the reactor coolant circulates between the nuclear reactor 5 and the steam generator 7. The reactor coolant is light water used as a coolant and a neutron moderator.

The turbine system 4 includes a turbine 22, which is coupled to the steam generator 7 via a steam pipe 21, a condenser 23, which is coupled to the turbine 22, and a feed pump 24, which is interposed in a water supply pipe 26 that couples the condenser 23 and the steam generator 7. Additionally, an electric generator 25 is coupled to the above-described turbine 22.

Here, a description will be given of a sequence of operations in the turbine system 4 of the nuclear facility 1. The vapor flowing from the steam generator 7 via the steam pipe 21 into the turbine 22 makes the turbine 22 to rotate. The rotation of the turbine 22 makes the electric generator 25, which is coupled to the turbine 22, to generate electricity. Subsequently, the vapor that flows out from the turbine 22 flows into the condenser 23. The condenser 23 has a cooling pipe 27 inside. The cooling pipe 27 has one side coupled to an intake pipe 28 to supply cooling water (such as seawater) while the cooling pipe 27 has another side coupled to a discharge pipe 29 to discharge the cooling water. Then, the condenser 23 cools the vapor, which flows in from the turbine 22, with the cooling pipe 27 to transform the vapor back to liquid. The liquid secondary coolant is fed to the steam generator 7 via the water supply pipe 26 by the feed pump 24. The secondary coolant fed to the steam generator 7 is transformed into vapor again by heat exchange with the reactor coolant in the steam generator 7.

Figure 2:
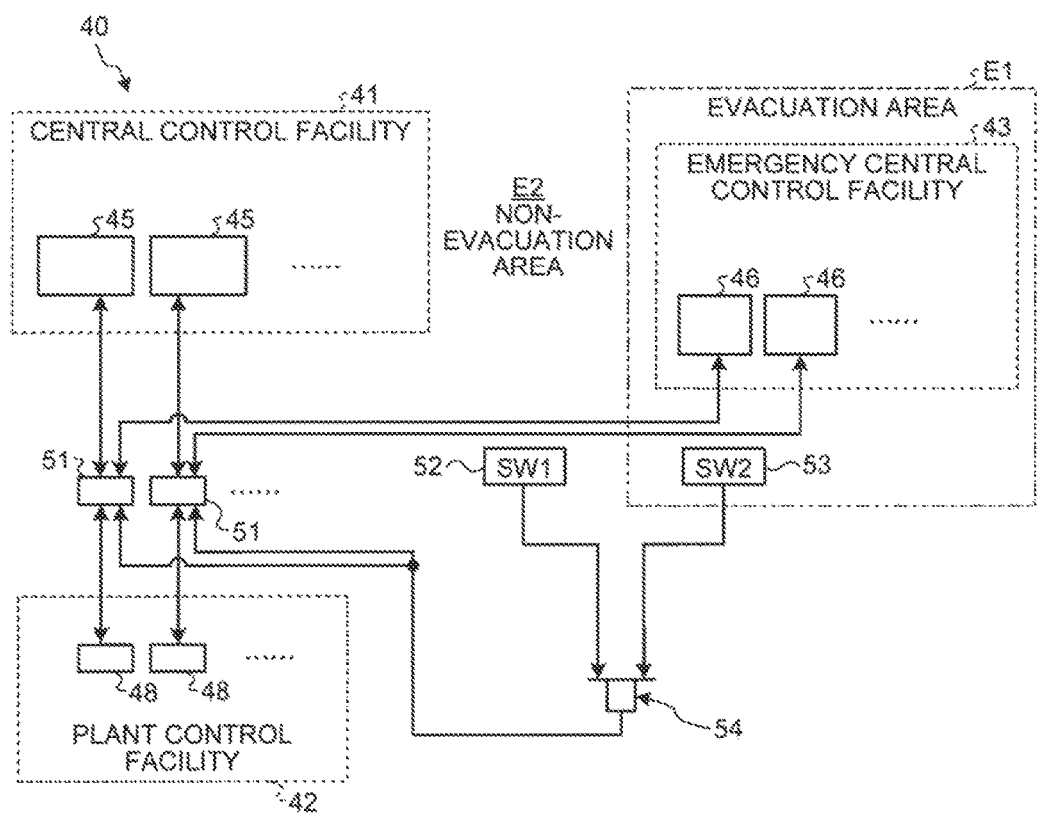
FIG. 2 is a block diagram illustrating the control system of the nuclear facility according to the embodiment.

FIG. 2 is a block diagram illustrating the control system of the nuclear facility according to the embodiment. The nuclear facility 1 thus configured includes the control system 40 that controls operations of the various pumps and each equipment such as a valve (not illustrated) disposed at the nuclear facility 1. This control system 40 includes a central control facility 41 in ordinary use, an emergency central control facility 43 for emergency, and a plant control facility 42. The central control facility 41 is able to control an operation of the nuclear facility 1. The emergency central control facility 43 is able to control an operation of the nuclear facility 1. The plant control facility 42 is coupled to the central control facility 41 and the emergency central control facility 43. The central control facility 41 and the emergency central control facility 43 are so-called digital facilities where arithmetic devices such as a CPU and storage devices such as an HDD are mounted, and are facilities that execute various programs stored in the storage devices by the arithmetic devices so as to control the nuclear facility 1.

The central control facility 41 includes a plurality of control devices (first operation control devices) 15 that control operations of the nuclear facility 1. Each control device 45 is a touch screen input device that integrally includes a display device, which displays an operating condition of the nuclear facility 1 on an operation screen, and an operating device for operating the nuclear facility 1 on the operation screen. This touch screen input device is what is called a VDU (Visual Display Unit). An operator to operate the nuclear facility 1 visibly recognizes the display device in each control device 45, and obtains the operating condition of the nuclear facility 1. The operator operates the operating device as necessary to control the operation of the nuclear facility 1.

The emergency central control facility 43 is used in case of emergency such as fire in the nuclear facility 1 and the central control facility 41 becomes unavailable. The emergency central control facility 43 includes an emergency control device (a second operation control device) 46 that controls an operation of the nuclear facility 1. A plurality of emergency control devices 16 are disposed corresponding to the plurality of control devices 45. Each emergency control device 46 is referred to as an evacuation panel, and is configured almost similarly to the central control facility 41. The emergency control device 46 integrally includes a display device, which displays an operating condition of the nuclear facility 1 on an emergency operation screen, and an operating device for operating the nuclear facility 1 on the emergency operation screen.

The plant control facility (a control device) 42 controls operations of the nuclear reactor 5 and each equipment of the nuclear facility 1 based on a signal input to/output from the central control facility 41 and the emergency central control facility 43. The plant control facility 42 includes a plurality of process circuits (processing devices) 48 that process signals input to/output from the respective control devices 45. The respective process circuits 48 each function as what is called a VDU processor. Each process circuit 48 is allowed to be coupled to the control device 45 and the emergency control device 46, and is also configured to process a signal input to/output from the emergency control device 46.

The nuclear facility 1 includes an evacuation area E1 and a non-evacuation area E2 other than the evacuation area E1. In the case where an emergency such as fire occurs in the nuclear facility 1, the operator evacuates from the non-evacuation area E2 to the evacuation area E1 through an evacuation route. Here, the central control facility 41 described above is disposed in the non-evacuation area E2 while the emergency central control facility 43 described above is disposed in the evacuation area E1. In view of this, when an emergency occurs, the operator uses the emergency central control facility 43 disposed in the evacuation area E1 to control the operation of the nuclear facility 1. At this time, the control system 40 of the nuclear facility 1 includes a configuration to switch from the control device 45 that the operator operates before the evacuation to the emergency control device 46 that the operator operates after the evacuation. The following specifically describes the control system 40 of the nuclear facility 1 that includes a signal switching unit 51, a first selector switch 52, a second selector switch 53, and an AND circuit 54.

A plurality of signal switching units 51 are disposed corresponding to the plurality of control devices 45. Each signal switching unit 51 is configured to switch: a normal coupling between the plant control facility 42 and the central control device facility 41, and an emergency coupling between the plant control facility 42 and the emergency central control facility 43. Each signal switching unit 51 holds the normal coupling in the case where an emergency switch signal is not input from the AND circuit 54, and each signal switching unit 51 switches from the normal coupling to the emergency coupling in the case where the emergency switch signal is input from the AND circuit 54.

The first selector switch 52 is disposed on the evacuation route in the non-evacuation area E2, and coupled to the input side of the AND circuit 54. This first selector switch 52 is switchable between the normal coupling side and the emergency coupling side. A switching operation from the normal coupling side to the emergency coupling side by the operator outputs the emergency switch signal from the first selector switch 52 to the AND circuit 54.

The second selector switch 53 is disposed in the evacuation area E1, and coupled to the input side of the AND circuit 54. This second selector switch 53 is also, similarly to the first selector switch 52, switchable between the normal coupling side and the emergency coupling side. A switching operation from the normal coupling side to the emergency coupling side by the operator outputs the emergency switch signal from the second selector switch 53 to the AND circuit 54.

The AND circuit 54 has the input side coupled to the first selector switch 52 and the second selector switch 53 while the AND circuit 54 has the output side coupled to the respective signal switching units 51. In the case where the AND circuit 54 receives the emergency switch signal from the first selector switch 52 and receives the emergency switch signal from the second selector switch 53, the AND circuit 54 outputs the emergency switch signal to the respective signal switching units 51. In other words, if the AND circuit 54 does not receive the emergency switch signal from at least any one of the first selector switch 52 and the second selector switch 53, the emergency switch signal is not output to the respective signal switching units 51.

Here, a description will be given of a sequence of operations to switch from the normal coupling to the emergency coupling in the control system 40 of the nuclear facility 1. In the case where an emergency occurs in the nuclear facility 1, the operator that has been operating the central control facility 41 moves from the non-evacuation area E2 to the evacuation area E1 through the evacuation route. At this time, the operator performs the switching operation of the first selector switch 52, which is disposed on the evacuation route, from the normal coupling side to the emergency coupling side. Subsequently, the operator who has moved to the evacuation area E1 performs the switching operation of the second selector switch 53, which is disposed in the evacuation area E1, from the normal coupling side to the emergency coupling side.

The AND circuit 54 receives the emergency switch signals from the first selector switch 52 and the second selector switch 53. In view of this, the AND circuit 54 outputs emergency switch signals to the plurality of signal switching units 51. The respective signal switching units 51, which receive the emergency switch signal, switch from the normal coupling to the emergency coupling. In view of this, the respective process circuits 48 in the normal coupling processes the signals that are input to/output from the respective control devices 45 via the respective signal switching units 51. After switching to the emergency coupling, the respective process circuits 48 process the signals input to/output from the respective emergency control devices 46 via the respective signal switching units 51.

The above-described configuration operates the first selector switch 52 and the second selector switch 53 to switch from the normal coupling to the emergency coupling. This facilitates collectively switching the operation with the respective control devices 45 to the operation with the respective emergency control devices 46. This consequently allows reducing operation burden on the operator during the operation of collective switching, compared with collective switching with the analog equipment. If the AND circuit 54 does not receive the emergency switch signal from the first selector switch 52 and the second selector switch 53, the AND circuit 54 does not output the emergency switch signal to the signal switching unit 51. In view of this, even if the incorrect operation, short circuit, or similar trouble makes any one of the first selector switch 52 and the second selector switch 53 to output the emergency switch signal, the AND circuit 54 does not output the emergency switch signal. This consequently ensures reduced occurrence of incorrect switching.

The process circuit 48 is configured to process the signals input to/output from the control device 45 and the emergency control device 46. This allows the control device 45 and the emergency control device 46 to share the process circuit 48. This eliminates the need for a newly added process circuit 48 in the plant control facility 42, and does not significantly change the configuration of the plant control facility 42. Accordingly, the plant control facility 42 allows easily reducing cost escalation of the facility.

While in this embodiment the process circuit 48 is disposed inside of the plant control facility 42, the process circuit 48 may be disposed outside of the plant control facility 42. The signal switching unit 51 may be disposed inside or outside of the plant control facility 42.

Furthermore, while in this embodiment the first selector switch 52 and the second selector switch 53 are configured to be switchable between the normal coupling side and the emergency coupling side, a configuration of Modification 1 illustrated in FIG. 3 may be possible. Here, FIG. 3 is a block diagram illustrating a first selector switch and a second selector switch according to Modification 1. While in the following description a description will be given of the first selector switch 52 to which the configuration according to Modification 1 is applied, this configuration may be applied to the second selector switch 53.

As illustrated in FIG. 3, the first selector switch 52 includes a first operating unit 61, a second operating unit 62, and an OR circuit 63. The first operating unit 61 is configured to be switchable between a normal coupling side and an emergency coupling side. A switching operation from the normal coupling side to the emergency coupling side by an operator outputs an emergency switch signal from the first operating unit 61 to the OR circuit 63. The second operating unit 62 is configured, similarly to the first operating unit 61, to be switchable between the normal coupling side and the emergency coupling side. A switching operation from the normal coupling side to the emergency coupling side by the operator outputs the emergency switch signal from the second operating unit 62 to the OR circuit 63

The OR circuit 63 has an input side coupled to the first operating unit 61 and the second operating unit 62 while the OR circuit 63 has an output side coupled to the AND circuit 54. In the case where the OR circuit 63 receives an emergency switch signal from at least any one of the first operating unit 61 and the second operating unit 62, the OR circuit 63 outputs the emergency switch signal to the AND circuit 54.

With the configuration of Modification 1, switching any one of the first operating unit 61 and the second operating unit 62 to the emergency coupling side allows inputting the emergency switch signal to the OR circuit 63. This allows the OR circuit 63 to output the emergency switch signal to the AND circuit 54. In view of this, even if any one of the first operating unit 61 and the second operating unit 62 is not able to output the emergency switch signal due to disconnection and similar trouble, this consequently allows outputting the emergency switch signal as long as the other operating unit is able to output the emergency switch signal.

INDUSTRIAL APPLICABILITY

As described above, the control system for the nuclear facility according to the present invention is effective for a nuclear facility where an operator is assumed to evacuate to an evacuation area. Especially, the control system for the nuclear facility is appropriate for a case where operations of the nuclear facility are operated in the evacuation area.

REFERENCE SIGNS LIST 1 nuclear facility
3 reactor cooling system
4 turbine system
5 nuclear reactor
7 steam generator
8 pressurizer
9 reactor coolant pump
15 fuel assembly
16 control rod
22 turbine
23 condenser
25 electric generator
27 cooling pipe
28 intake pipe
29 discharge pipe
40 control system
41 central control facility
42 plant control facility
43 emergency central control facility
45 control device
46 emergency control device
48 process circuit
51 signal switching unit
52 first selector switch 53 second selector switch
54 AND circuit
61 first operating unit
62 second operating unit
63 OR circuit
E1 evacuation area
E2 non-evacuation area

The invention claimed is:

1. A control system for controlling a nuclear facility in an evacuation area, the control system comprising:
- a first operation control device, the first operation control device being disposed in a non-evacuation area, the non-evacuation area being an area other than the evacuation area;
- a second operation control device for emergency, the second operation control device being disposed in the evacuation area;
- a control device connectable to the first operation control device or the second operation control device;
- a signal switching unit configured to switch from a normal coupling between the control device and the first operation control device to an emergency coupling between the control device and the second operation control device based on an emergency switch signal to be input;
- a first selector switch disposed in the non-evacuation area, the first selector switch being switchable by an operator and being configured to generate a first emergency switch signal in response to a first switching operation by the operator for switching to the emergency coupling, wherein the first emergency switch signal is not a signal generated from the fist operation control device and is not a signal generated from the second operation control device;
- a second selector switch disposed in the evacuation area, the second selector switch being switchable by the operator and being configured to generate a second emergency switch signal in response to a second switching operation by the operator for switching into the emergency coupling, wherein the second emergency switch signal is not a signal generated from the first operation control device and is not a signal generated from the second operation control device;
- an AND circuit with an input side and an output side, the input side being coupled to the first selector switch and the second selector switch, the output side being coupled to the signal switching unit, wherein
the AND circuit is configured to generate the emergency switch signal in a case where the first emergency switch signal is input from the first selector switch and the second emergency switch signal is input from the second selector switch, and output the emergency switch signal to the signal switching unit,
the signal switching unit maintains the normal coupling when the emergency switch signal is not input from the AND circuit, and switches from the normal coupling to the emergency coupling when the emergency switch signal is input from the AND circuit.

2. The control system according to claim 1, wherein
the control device includes a processing device coupled to the signal switching unit, and
the processing device is configured to: process a signal input to/output from the first operation control device through the signal switching unit; and process a signal input to/output from the second operation control device through the signal switching unit.

3. The control system according to claim 1, wherein
the first selector switch includes:
- a first operating unit configured to output the first emergency switch signal by the first switching operation to the emergency coupling;
- a second operating unit configured to output the first emergency switch signal by the first switching operation to the emergency coupling; and
- an OR circuit with an input side and an output side, the input side being coupled to the first operating unit and the second operating unit, the output side being coupled to the AND circuit, wherein
the OR circuit is configured to output the first emergency switch signal to the AND circuit in a case where the first emergency switch signal is input from at least any one of the first operating unit and the second operating unit.

4. A control system according to claim 1, wherein
the second selector switch includes:
- a first operating unit configured to output the second emergency switch signal by the second switching operation to the emergency coupling;
- a second operating unit configured to output the second emergency switch signal by the second switching operation to the emergency coupling; and
- an OR circuit with an input side and an output side, the input side being coupled to the first operating unit and the second operating unit, the output side being coupled to the AND circuit, wherein
the OR circuit is configured to output the second emergency switch signal to the AND circuit in a case where the second emergency switch signal is input from at least any one of the first operating unit and the second operating unit.

* * * * *